(12) United States Patent
Paulus

(10) Patent No.: US 10,474,709 B2
(45) Date of Patent: Nov. 12, 2019

(54) DEEP REINFORCED MODEL FOR ABSTRACTIVE SUMMARIZATION

(71) Applicant: salesforce.com, inc., San Francisco, CA (US)

(72) Inventor: Romain Paulus, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/815,686

(22) Filed: Nov. 16, 2017

(65) Prior Publication Data

US 2018/0300400 A1 Oct. 18, 2018

Related U.S. Application Data

(60) Provisional application No. 62/485,876, filed on Apr. 14, 2017.

(51) Int. Cl.
*G06N 3/04* (2006.01)
*G06N 3/08* (2006.01)
(Continued)

(52) U.S. Cl.
CPC .......... *G06F 16/345* (2019.01); *G06F 17/277* (2013.01); *G06F 17/289* (2013.01);
(Continued)

(58) Field of Classification Search
CPC . G10L 21/0205; G10L 21/0232; G10L 25/21; G10L 25/18; G06F 17/2785;
(Continued)

(56) References Cited

U.S. PATENT DOCUMENTS 6,745,161 B1* 6/2004 Arnold ................ G06F 16/3338
704/7
2008/0109425 A1* 5/2008 Yih ...................... G06F 16/345
(Continued)

OTHER PUBLICATIONS

A Large Scale Chinese Short Text Summarization Dataset Baotian Hu Qingcai Chen Fangze Zhu Intelligent Computing Research Center Harbin Institute of Technology, Shenzhen Graduate School (Year: 2016).*

(Continued)

*Primary Examiner* — Mohammad K Islam
(74) *Attorney, Agent, or Firm* — Haynes and Boone, LLP

(57) ABSTRACT

Disclosed RNN-implemented methods and systems for abstractive text summarization process input token embeddings of a document through an encoder that produces encoder hidden states; applies the decoder hidden state to encoder hidden states to produce encoder attention scores for encoder hidden states; generates encoder temporal scores for the encoder hidden states by exponentially normalizing a particular encoder hidden state's encoder attention score over its previous encoder attention scores; generates normalized encoder temporal scores by unity normalizing the temporal scores; produces the intra-temporal encoder attention vector; applies the decoder hidden state to each of previous decoder hidden states to produce decoder attention scores for each of the previous decoder hidden states; generates normalized decoder attention scores for previous decoder hidden states by exponentially normalizing each of the decoder attention scores; identifies previously predicted output tokens; produces the intra-decoder attention vector and processes the vector to emit a summary token.

25 Claims, 13 Drawing Sheets

(51) Int. Cl.
  *G06F 16/34* (2019.01)
  *G06F 17/27* (2006.01)
  *G06F 17/28* (2006.01)
(52) U.S. Cl.
  CPC ......... *G06N 3/0445* (2013.01); *G06N 3/0454* (2013.01); *G06N 3/08* (2013.01)
(58) Field of Classification Search
  CPC ........ G06F 16/93; G06F 16/94; G06F 16/345; G06F 17/24; G06F 17/30; G06F 17/21; G06N 5/04
  See application file for complete search history.

(56) References Cited

U.S. PATENT DOCUMENTS

| | | | |
|---|---|---|---|
| 2016/0350653 | A1 | 12/2016 | Socher et al. |
| 2017/0024645 | A1 | 1/2017 | Socher et al. |
| 2017/0147544 | A1* | 5/2017 | Modani .................... G06F 17/24 |
| 2018/0232342 | A1* | 8/2018 | Tong .................... G06F 17/2881 |
| 2018/0232443 | A1* | 8/2018 | Delgo .................... G06F 17/278 |
| 2018/0300400 | A1 | 10/2018 | Paulus |
| 2018/0365579 | A1* | 12/2018 | Wan ........................ G06N 5/046 |

OTHER PUBLICATIONS

Abstractive Text Summarization using Sequence-to-sequence RNNs and Beyond, Ramesh Nallapati, IBM Watson (Year: 2016).*
A Hierarchical Neural Autoencoder for Paragraphs and Documents, Jiwei Ll (Year: 2015).*
A Neural Attention Model for Abstractive Sentence Summarization Alexander M. Rush Facebook AI Research / Harvard SEAS (Year: 2015).*
Bahdanau et al., "Neural Machine Translation by Jointly Learning to Align and Translate," Published as Conference Paper at the International Conference on Learning Representation. Banff, Canada. Apr. 14-16, 2014. pp. 1-15.
Cheng et al., "Long Short-Term Memory-Networks for Machine Reading," Published as Conference Paper at Empirical Methods in Natural Language Processing. School of Informatics, University of Edinburgh. Sep. 20, 2016. pp. 1-11.
Chopra et al., "Abstractive Sentence Summarization with Attentive Recurrent Neural Networks," Proceedings of NAACL-HLT 2016, Conference of the North American Chapter of the Association for Computational Linguistics: Human Language Technologies. San Diego, CA. Jun. 12-17, 2016. pp. 1-6.
Chung et al., "Empirical Evaluation of Gated Recurrent Neural Networks on Sequence Modeling," Presented in Neural Information Processing Systems 2014 Deep Learning and Representation Learning Workshop. Montreal, Canada. Dec. 8-13, 2014. pp. 1-9.
Colmenares et al., "Heads: Headline Generation as Sequence Prediction Using an Abstract Feature-Rich Space," Human Language Technologies: The 2015 Annual Conference of the North American Chapter of the Association for Computational Linguistics. Denver, Colorado, May 31-Jun. 5, 2015. pp. 1-10.
Dorr et al., "Hedge Trimmer: A Parse-and-Trim Approach to Headline Generation," Proceedings of the North American Chapter of the Association for Computational Linguistics: Human Language Technologies. Stroudsburg, PA, USA. May 31-Jun. 1, 2013. pp. 1-8.
Filippova et al., "Overcoming the Lack of Parallel Data in Sentence Compression," Proceedings of the 2013 Conference on Empirical Methods in Natural Language Processing. Seattle, Washington. Oct. 18-21, 2013. pp. 1-11.
Gulcehre et al., "Pointing the Unknown Words," Proceedings of the 54th Annual Meeting of the Association for Computational Linguistics, vol. 1, Long Papers. Berlin, Germany. Aug. 21, 2016. pp. 1-10.
Hermann et al., "Teaching Machines to Read and Comprehend," Proceedings of the 28th International Conference on Neural Information Processing Systems, vol. 1. Montreal, Canada. Dec. 7-12, 2015. pp. 1-9.
Hochreiter et al., "Long Short-Term Memory: Neural Computation," Neural Computation, vol. 9, Issue 8. Nov. 15, 1997. pp. 1-46.
Hong et al., "Improving the Estimation of Word Importance for New Multi-Document Summarization—Extended Technical Report," Proceedings of the 14th Conference of the European Chapter of the Association for Computational Linguistics. Gothenburg, Sweden. Apr. 26-30, 2014. pp. 1-10.
Hong et al., "System Combination for Multi-document Summarization," Proceedings of the 2015 Conference on Empirical Methods in Natural Language Processing. Lisbon, Portugal. Sep. 17-21, 2015. pp. 1-11.
Inan et al., "Tying Word Vectors and Word Classifiers: A Loss Framework for Language Modeling," International Conference on Learning Representations, Toulon, France. Apr. 24-26, 2017. pp. 1-13.
Kingma et al., "Adam: A Method for Stochastic Optimization," Published as a Conference paper at the International Conference on Learning Representations. Banff, Canada. Dec. 22, 2014. pp. 1-15.
Li et al., "The Role of Dscourse Units in Near-Extractive Summarization," In the 17th Annual Meeting of the Special Interest Group on Discourse and Dialogue. Los Angeles, CA. Sep. 13-15, 2016. pp. 1-11.
Lin et al., "ROUGE: A Package for Automatic Evaluation of Summaries," Text Summarization Branches out: Proceedings of the Association for Computational Linguistics Workshop (vol. 8). Barcelona, Spain. May 2-7, 2004. pp. 1-8.
Ling et al., "Latent Predictor Networks for Code Generation," 2016. arXiv preprint arXiv:1603.06744. https://arxiv.org/pdf/1603.06744.pdf. pp. 1-11.
Liu et al., "How Not to Evaluate Your Dialogue System: An Empirical Study of Unsupervised Evaluation Metrics for Dialogue Responses Generation," Proceedings of the 2016 Conference on Empirical Methods in Natural Language Processing, Association for Computational Linguistics. Austin, Texas. Nov. 1-5, 2016. pp. 1-11.
Manning et al., "The Stanford CoreNLP Natural Language Processing Toolkit," Proceedings of 52nd Annual Meeting of the Association for Computational Linguistics: System Demonstrations, Linguistics and Computer Science, Baltimore, Maryland. Jun. 2014. pp. 1-6.
Merity et al., "Pointer Sentinel Mixture Models," Published as a Conference paper at the International Conference on Learning Representations. San Juan, Puerto Rico. Sep. 26, 2016. pp. 1-13.
Mikolov et al., "Distributed Representations of Words and Phrases and their Compositionality," Proceedings of the 26th International Conference on Neural Information Processing Systems—vol. 2, pp. 3111-3119, Lake Tahoe, NV Dec. 5-10, 2013.
Nallapati et al., "Abstractive Text Summarization Using Sequence-to-Sequence RNNs and Beyond," Proceedings of the 20th Special Interest Group on Natural Language Learning: Conference on Computational Natural Language Learning. Berlin, Germany. Aug. 26, 2016. pp. 1-12.
Neto et al., "Automatic Text Summarization Using a Machine Learning Approach," Brazilian Symposium on Artificial Intelligence. Ger-Verlag Berlin, Heidelberg. Nov. 11-14, 2002. pp. 1-11.
Norouzi et al., "Reward Augmented Maximum Likelihood for Neural Structured Prediction," Advances in Neural Structured Prediction. Barcelona, Spain. Dec. 5-10, 2016. pp. 1-9.
Nye et al., "Identification and Characterization of Newsworthy Verbs in World News," Human Language Technologies: The 2015 Annual Conference of the North American Chapter of the Association for Computational Linguistics. Denver, Colorado. May 31-Jun. 5, 2015. pp. 1-6.
Pennington et al., "GloVe: Global Vectors for Word Representation," Proceedings of the 2014 Conference on Empirical Methods in Natural Language Processing. Doha, Qatar. Oct. 25-29, 2014. pp. 1-12.
Press et al., "Using the Output Embedding to Improve Language Models," Proceedings of the 15th Conference of the European Chapter of the Association for Computational Linguistics: vol. 2 (Short Papers). Valencia, Spain. Apr. 3-7, 2017. pp. 1-7.

(56) References Cited

OTHER PUBLICATIONS

Ranzato et al., "Sequence Level Training With Recurrent Neural Networks," Published as a Conference Paper at the International Conference on Learning Representation. San Juan, Puerto Rico. May 2-4, 2016. pp. 1-16.
Rennie et al., "Self-Critical Sequence Training for Image Captioning," Conference on Computer Vision and Pattern Recognition. Honolulu, Hawaii. Jul. 21-26, 2017. pp. 1-16.
Rush et al., "A Neural Attention Model for Sentence Summarization," Proceedings of the 2015 Conference on Empirical Methods in Natural Language Processing. Lisbon, Portugal. Sep. 17-21, 2015. pp. 1-11.
Sandhaus, "The New York Times Annotated Corpus Overview," Linguistic Data Consortium (LDC2008T19). Philadelphia, PA. Oct. 17, 2008. pp. 1-22.
Sankaran et al., "Temporal Attention Model for Neural Machine Translation," arXiv preprint arXiv:1608.02927. https://arxiv.org/pdf/1608.02927.pdf. pp. 1-10.
Sutskever et al., "Sequence to Sequence Learning with Neural Networks," In Advances in Neural Information Processing Systems. Montreal, Canada. Dec. 8-13, 2014. pp. 1-9.
Venkatraman et al., "Improving Multi-step Prediction of Learned Time Series Models," Association for the Advancement of Artificial Intelligence. Austin, Texas. Jan. 25-30, 2015. pp. 1-7.
Vinyals et al., "Pointer Networks," Advances in Neural Information Processing Systems. Montreal, Canada. Dec. 7-12, 2015. pp. 1-9.
Williams et al., "A Learning Algorithm for Continually Running Fully Recurrent Neural Networks," Neural Computation, vol. 1, Issue 2. Massachusetts Institute of Technology. Summer 1989. pp. 1-10.
Williams, "Simple Statistical Gradient-Following Algorithms for Connectionist Reinforcement Learning," Appears in Machine Learning, vol. 8, Issue 3-4. May 1992. pp. 1-27.
Wu et al., "Google's Neural Machine Translation System: Bridging the Gap Between Human and Machine Translation," Oct. 8, 2016. pp. 1-23. arXiv preprint arXiv:1609.08144. https://arxiv.org/pdf/1609.08144.pdf.
Yang et al., "Detecting Information-Dense Texts in Multiple News Domains," Proceedings of the Twenty-Eighth Conference Association for the Advancement of Artificial Intelligence. Quebec, Canada. Jul. 27-31, 2017. pp. 1-7.
Zeng et al., "Efficient Summarization with Read-Again and Copy Mechanism," Under Review as a Conference Paper at the International Conference on Learning Representation. Toulon, France. Apr. 24-26, 2017. pp. 1-12.
Li et al., "Deep Reinforcement Learning: An Overview," AlphaGo seminar at MIT, Apr. 2016. pp. 1-30. Jan. 26, 2017.
Lin, "Rouge: A Package for Automatic Evaluation of Summaries," Barcelona, Spain, In Proceedings of Workshop on Text Summarization Branches Out, Post-Conference Workshop of ACL 2004, 1-10.
Luong et al., "Effective Approaches to Attention-based Neural Machine Translation," Stanford, CA, 1-11. Sep. 20, 2015.
Maples, "The Rouge-AR: A Proposed Extension to the Rouge Evaluation metric for Abstractive Text Summarization," Stanford University, 2016.

* cited by examiner

| Article | Summary (ground truth) | Summary (our model) |
|---|---|---|
| Google Wallet says it has changed its policy when storing users' funds as they will now be federally-insured (file photo) for those who use Google Wallet, their money just became safer with federal-level insurance. Google confirmed to Yahoo Finance in a statement that its current policy changed - meaning the company will store the balances for users of the mobile transfer service (similar to PayPal and Venmo) in multiple federally-insured banking institutions. This is good news for people who place large amounts of money in their Wallet Balance because the Federal Deposit Insurance Corporation insures funds for banking institutions up to $250,000. Currently, Google's user agreement says funds are not protected by the FDIC. However, a Google spokesperson told Yahoo Finance that the current policy has changed (...) | Google spokesperson confirmed current policy changed meaning funds will be protected by the federal deposit insurance corporation. As a non-banking institution, Google Wallet, along with competitors PayPal and Venmo, is not legally required to be federally insured. With the new change to its policy, funds in wallet balance are protected if anything were to happen to the company like bankruptcy. | Google confirmed to Yahoo Finance in a statement that its current policy changed. The company will store the balances for users of the mobile transfer service (similar to PayPal and Venmo) in multiple federally-insured banking institutions. Google's user agreement says funds are not protected by the federal deposit insurance corporation. |

FIG. 11

| Article | Summary (ground truth) | Summary (our model) |
|---|---|---|
| Talk about a chain reaction! This is the moment a billiards player performs a complex trick shot by setting up a domino train to pot four balls. Video footage shows a white ball being rolled down a positioned cue. It then bounces off one side of the red-clothed table and hits the first in a long line of dominoes. One by one the small counters fall down, tapping balls into various pockets as they go. First a yellow, then a blue, then a red. Finally, the last domino gently hits an orange ball, causing it to roll down another positioned cue lying on the table. The orb then knocks a green ball into the center pocket. In less than 30 seconds the stunt comes to a close. (...) | The clip was uploaded by youtube user honda4ridered. In another upload the skilled billiards player shows viewers how to pocket four balls in a single shot and for those who miss it there's a slow motion version. | Video footage shows a white ball being rolled down a jumper. It then bounces off one side of the red-clothed table and hits the first in a long line of dominoes. One by one the small counters fall down, tapping balls into pockets as they go-first a yellow. It comes to a close. The clip was uploaded by youtube user honda4ridered. |

FIG. 12

DEEP REINFORCED MODEL FOR ABSTRACTIVE SUMMARIZATION

RELATED APPLICATION

This application claims the benefit of U.S. Provisional Application No. 62/485,876, entitled "A DEEP REINFORCED MODEL FOR ABSTRACTIVE SUMMARIZATION", filed Apr. 14, 2017. The related application is hereby incorporated by reference herein for all purposes.

FIELD OF THE TECHNOLOGY DISCLOSED

The technology disclosed relates generally to natural language processing (NLP) using deep neural networks, and in particular relates to recurrent neural network (RNN) based encoder-decoder models that improve prediction of summary tokens for abstractive summarization of text in neural network sequence modeling.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The last few decades have witnessed a fundamental change in the challenge of taking in new information. The bottleneck is no longer access to information; now it is our ability to keep up. We all have to read more and more to keep up-to-date with our jobs, the news, and social media. AI can improve people's work by helping with this information deluge. One answer is to use a deep reinforced model for abstractive summarization to automatically summarize longer texts.

Automatic text summarization is a field of natural language processing that is increasingly used in industry today. The goal of the summarization process is to create a summary of one document or multiple documents that will retain the sense and the most important aspects while reducing the length substantially, to a size that may be user-defined. Training a model that can generate long, coherent, and meaningful summaries remains an open research problem. Generating any kind of longer text is hard for even the most advanced deep learning models.

Text summarization is the process of automatically generating natural language summaries from an input document while retaining the important points. By condensing large quantities of information into short, informative summaries, summarization can aid many downstream applications such as creating news digests, search, and report generation.

Automatic summarization models can work in one of two ways: by extraction or by abstraction. Extractive models form summaries by copying parts of the input without any modification, selecting relevant phrases of the input document, and concatenating them to form a summary. They are quite robust since they use existing natural-language phrases that are taken straight from the input, but they lack in flexibility since they cannot use novel words or connectors. They also cannot paraphrase like people sometimes do. In contrast, abstractive models generate a summary based on the actual "abstracted" content. An abstraction-based summary can compress, fuse or paraphrase sections of the source document, using words that were not in the original input, generating new phrases and possibly rephrasing. This gives a lot more potential to produce fluent and coherent summaries but it is also a much harder problem, as the model must be able to generate coherent phrases and connectors.

Even though abstractive models are more powerful in theory, it is common for them to make mistakes in practice. Typical mistakes include incoherent, irrelevant or repeated phrases in generated summaries, especially when trying to create long text outputs. They historically have lacked a sense of general coherence, flow and readability.

ROUGE, which is short for recall-oriented understudy for gisting evaluation, is the name of a set of metrics and a software package usable for evaluating automatic summarization in natural language processing. ROUGE works by comparing matching sub-phrases in generated summaries against sub-phrases in ground truth reference summaries, even if they are not perfectly aligned. That is, the metrics compare an automatically produced summary against a set of human-produced summaries.

Recent neural network models based on the attentional encoder-decoder model for machine translation (Nallapati et al., 2016; Zeng et al., 2016) have been able to generate abstractive summaries with high ROUGE scores. However, these systems have typically focused on summarizing short input sequences of one or two sentences, to generate even shorter summaries—for example with a limit of 75 characters.

Nallapati et al. (2016) applied their abstractive summarization model on the CNN/Daily Mail dataset (Hermann et al., 2015), which contains input sequences of up to 800 tokens and multi-sentence summaries of up to 100 tokens. The analyses by Nallapati et al. (2016) illustrate a key problem with attentional encoder-decoder models: they often generate unnatural summaries consisting of repeated phrases.

The disclosed robust and coherent abstractive text summarization model addresses these issues of general coherence, flow and readability, as well as unnatural summaries with repeated phrases. Other aspects and advantages of the technology disclosed can be seen on review of the drawings, the detailed description and the claims, which follow.

SUMMARY

Attentional, recurrent neural network (RNN) based encoder-decoder models for abstractive text summarization have achieved good performance on short input and output sequences. However, for longer documents and summaries, these models often include repetitive and incoherent phrases.

The disclosed technology includes a neural network model with intra-attention and a new training method. This method combines standard supervised word prediction and reinforcement learning (RL). Models trained only with standard supervised word prediction often exhibit "exposure bias"—they assume ground truth is provided at each step during training. However, when standard word prediction is combined with the global sequence prediction training of RL, the resulting summaries become more readable.

The disclosed neural network-implemented method of abstractive text summarization includes processing input token embeddings of a document through a recurrent encoder that produces encoder hidden states for each of the embeddings; initializing a recurrent attentive decoder with an ultimate encoder hidden state and a special start-of-summary token to produce decoder hidden states at successive decoding steps; and at each decoding step, the decoder emitting a summary token using a current intra-temporal encoder attention vector, a current intra-decoder attention vector, and a current decoder hidden state. The method also includes applying the current decoder hidden state to each of the encoder hidden states to produce current encoder attention scores for each of the encoder hidden states; generating current encoder temporal scores for each of the encoder hidden states by exponentially normalizing a particular encoder hidden state's current encoder attention score over its previous encoder attention scores; generating current normalized encoder temporal scores by unity normalizing the current encoder temporal scores; producing the current intra-temporal encoder attention vector as a convex combination of the encoder hidden states scaled by the corresponding current normalized encoder temporal scores; applying the current decoder hidden state to each of previous decoder hidden states to produce current decoder attention scores for each of the previous decoder hidden states; generating current normalized decoder attention scores for each of the previous decoder hidden states by exponentially normalizing each of the current decoder attention scores; and producing the current intra-decoder attention vector as convex combination of the previous decoder hidden states scaled by the corresponding current normalized decoder attention scores and processing the vector to emit a summary token The technology disclosed relates to an abstractive summarization system in which an intra-decoder attention mechanism identifies previously predicted output tokens and prevents the system from predicting already predicted output tokens. The disclosed abstractive summarization system is enhanced by training the system using a combination of reinforcement learning and supervised learning, improving the readability of the summary. The disclosed system is applicable to long sequence generation problems.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

FIG. 11 and FIG. 12 show example documents and multi-sentence summaries generated by the disclosed architecture, based on the example documents, in comparison to human-generated ground truth summaries.

DETAILED DESCRIPTION

Figure 1:
FIG. 1 illustrates aspects of abstractive text summarization architecture for automatic text summarization.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

A major difficulty in automatically generating summaries of documents is the generation of unnatural summaries that include repeated phrases and that lack general coherence, flow and readability. While ROUGE scores have a good correlation with human judgement in general, the summaries with the highest ROUGE are not necessarily the most readable or natural ones.

The disclosed abstractive text summarization architecture, with intra-attention and a new training method, combines supervised word classification and reinforcement learning (RL) to make document summarization more successful than summaries generated using earlier models.

To address the problem of generating unnatural summaries, the disclosed abstractive text summarization architecture uses two key intra-attention mechanisms: an intra-temporal attention in the encoder that records previous attention weights for each of the input tokens and sequential intra-attention in the decoder that takes into account which words have already been generated by the decoder. The disclosed architecture also uses a mixed training objective function that mixes the maximum-likelihood cross-entropy loss with rewards from policy gradient reinforcement learning to reduce exposure bias. The disclosed architecture generates more readable summaries compared to other techniques, as shown through human evaluation of generated outputs, described next.

The disclosed abstractive text summarization architecture is trained with teacher forcing and reinforcement learning at the same time, utilizing both word-level and whole-summary-level supervision to make summaries more coherent and readable. To reduce evaluation bias, five human evaluators rated each test example document summary—rating both summary readability and summary relevance separately, instead of readability only. These results confirm that the disclosed mixed objective training method increases both summary quality and relevance compared to other training methods. Mixed-objective learning experiments were run using the same reinforcement reward used for reinforcement learning experiments (ROUGE-L with sentence splitting), to make the comparison between reinforcement learning and mixed-objective learning more relevant.

The disclosed abstractive text summarization architecture achieves state-of-the-art results on the CNN/Daily Mail dataset and similarly good results on the New York Times dataset (NYT). In a comparison of the disclosed abstractive text summarization architecture against extractive baselines (lead sentences, first words), extractive models (Durrett et al., 2016, Nallapati et al. 2017) and other abstractive models (See et al., 2017), the disclosed architecture obtains better ROUGE performance than these baselines and models, offering more readable automatically generated document summaries. See FIG. 10 infra.

Recurrent neural networks (RNNs) are useful for abstractive summarization modeling due to their ability to retain long term dependencies. RNN deep learning models can process sequences of text of variable length and compute useful representations, or a hidden state, for each phrase.

The disclosed abstractive text summarization architecture reads the input sequence for a document with a bidirectional LSTM encoder $\{RNN^{e\_fwd}; RNN^{e\_bwd}\}$, computing hidden states from the embedding vectors of $x_i$. The architecture uses a single LSTM decoder $RNN_d$, computing hidden states from the embedding vectors of $y_t$. The sequence of input tokens for a document is represented as $X=x_1, x_2, \ldots, x_n$. The sequence of output summary tokens is represented as $Y=y_1, y_2, \ldots, y_n$ and the vector concatenation operator is denoted by ||. Both input and output embeddings are taken from the same matrix, described infra.

FIG. 1 illustrates aspects of disclosed abstractive text summarization architecture 100 usable for readings and comprehending documents stored in data store 118 and generating summaries, which can be stored in document summary data store 188. Architecture 100 includes abstract text summarization system 102 which includes embedder 112 which maps each word in a document to a vector space; and encoder neural network 122—a recurrent neural network (RNN) that incorporates contextual information into the representation of each word in a document. Encoder neural network 122 is a bidirectional Long Short-Term Memory (LSTM) neural network, which is useful for incorporating information for words both preceding and following an output word.

Continuing with FIG. 1, architecture 100 also includes inter-hidden state comparator 132 for generating attention scores, and exponential normalizer of intra-temporal encoder attention 142 for normalizing over previous decoding steps for an individual token position, penalizing input tokens that have obtained high attention scores in past decoding steps. Additionally included in architecture 100 are unity normalizer 152 for normalizing over all of the temporal scores and encoding mixer 162 for generating encoder context vectors. Also included are single LSTM RNN-based decoder neural network 182 for computing hidden states from the embedding vectors of output $y_t$; intra-hidden state comparator 172 for computing decoder hidden state comparison values; exponential normalizer of intra-temporal decoder attention 184 for producing the convex combination of the encoder hidden states scaled by the corresponding current normalized encoder temporal scores; and decoding mixer 186 for generating decoder context vectors. Architecture 100 also includes summary word emitter 192, which provides pointer data for output summary tokens 194 and document summary data store 198 for storing results for abstractive text summarization architecture 100.

Figure 2:
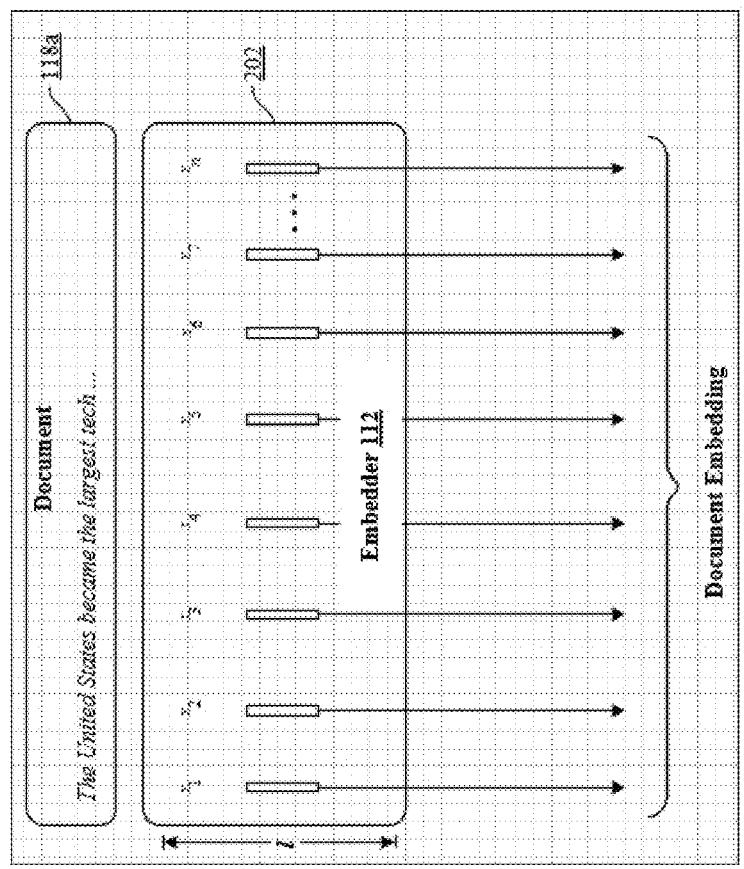
FIG. 2 shows an embedder which maps each word in a document to be summarized to a high-dimensional vector space.

FIG. 2 shows embedder 112 which maps each word in the document 118a to a high-dimensional vector space, referred to herein as the word "embedding space". In one implementation, embedder 112 generates a sequence 202 of l-dimensional word vectors $x_1, x_2, \ldots x_n$ corresponding to n words in the document 118a using an embedding matrix $Wemb \in^{l \times |v|}$, where v represents the size of the vocabulary. In one implementation, embedder 112 first transforms every word in the document 118a into one-hot representations, and then converts them into continuous representations using the embedding matrix $Wemb \in^{l \times |v|}$. In yet another implementation, embedder 112 initializes the word embeddings using pre-trained word embedding models such as GloVe and word2vec to obtain a fixed word embedding of each word in the document 118a. In other implementations, embedder 112 generates character embeddings and/or phrase embeddings.

Figure 3:
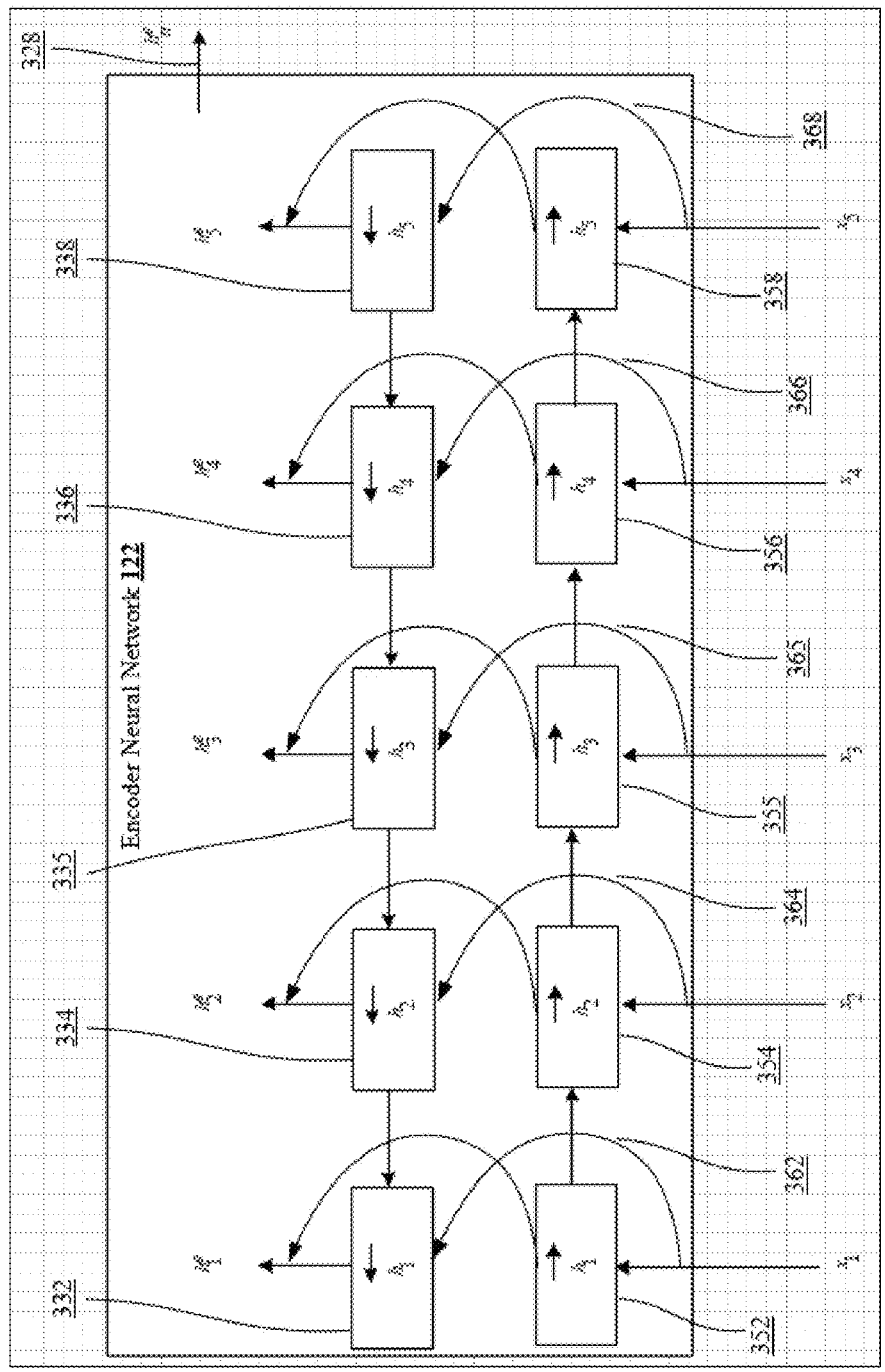
FIG. 3 shows an encoder neural network with bidirectional LSTM which utilizes five example inputs from the output of the embedder of FIG. 2.

FIG. 3 shows bidirectional LSTM 300 with encoder neural network 122, with five example inputs $x_1, x_2, x_3, x_4, x_5$ from the output of embedder 112, for processing input token embeddings of a document through a recurrent encoder that produces encoder hidden states for each of the embeddings. Bidirectional LSTM 300 utilizes both the previous and future context by processing the sequence in two directions, and generates two independent sequences of LSTM output vectors. One processes the input sequence in the forward direction, while the other processes the input in the reverse direction. One memory layer 352, 354, 355, 356, 358 passes an intermediate sequential representation 362, 364, 365, 366, 368 to the next layer 332, 334, 335, 336, 338. In example shown in FIG. 3, at each time step the output hidden state $H^e = h_1^e, h_2^e, h_3^e, h_4^e, h_5^e$ is the concatenation of the two output vectors, one from each direction at that time step.

The disclosed abstractive text summarization architecture computes the encoder context vector for a time stamp, the decoder context vector for the same time stamp and the decoder hidden states. Using these two contexts and the current decoder hidden state, a new word is generated and added to the output sequence.

Figure 4:
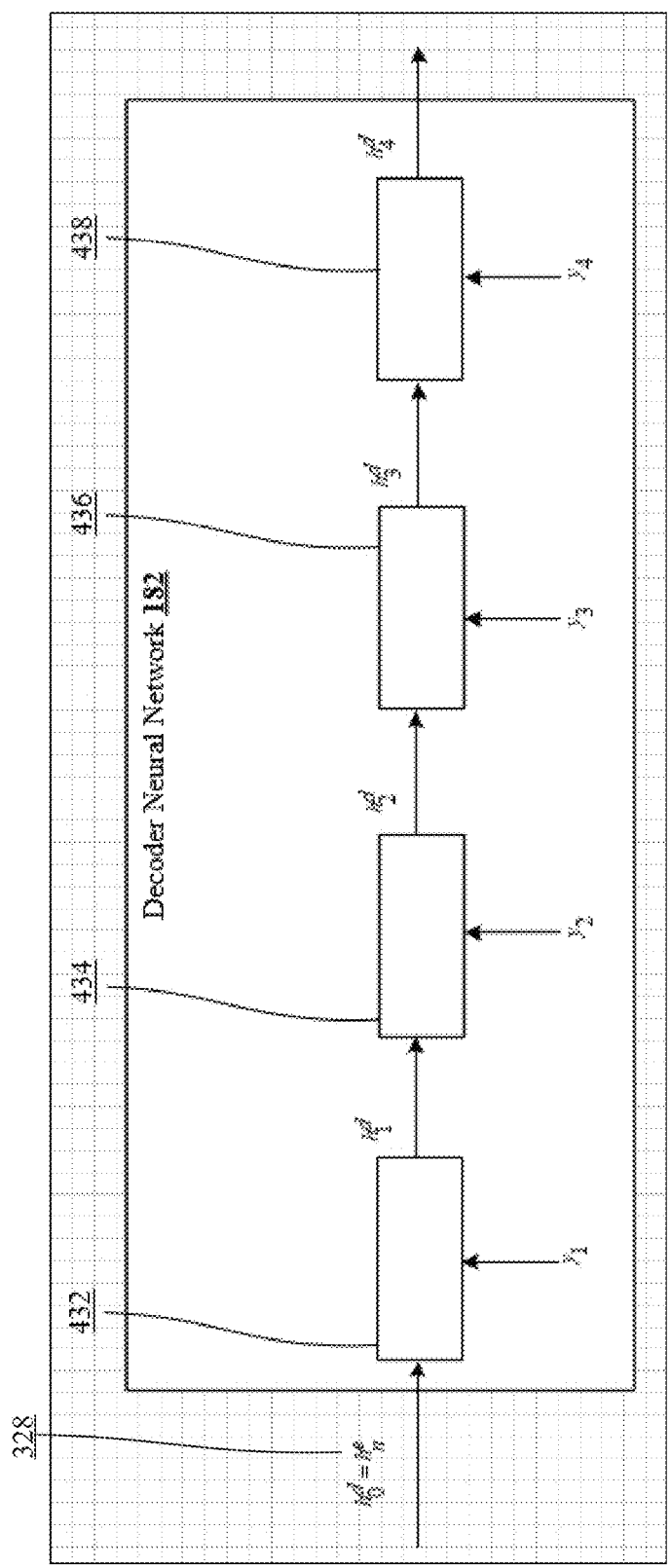
FIG. 4 shows a decoder neural network with single LSTM RNNs for computing hidden states from embedding vectors.

FIG. 4 shows decoder neural network 182 with single LSTM RNN 432, 434, 436, 438 for computing hidden states $h_t^d$ from the embedding vectors of $y_t$: initializing a recurrent attentive decoder with an ultimate encoder hidden state 328 and a special start-of-summary token to produce decoder hidden states at successive decoding steps. At each decoding step, the decoder emits a summary token using a current intra-temporal encoder attention vector, a current intra-decoder attention vector, and a current decoder hidden state, applying the current decoder hidden state to each of the encoder hidden states to produce current encoder attention scores for each of the encoder hidden states. The hidden state of decoder neural network 182 is initialized with $h_0^d = h_n^e$ from encoder neural network 122. Decoder neural network 182 computes the decoder hidden state at each time stamp, looking back at parts of the input document when generating a new word using temporal attention, to make the abstractive summarization model outputs more coherent.

Figure 5:
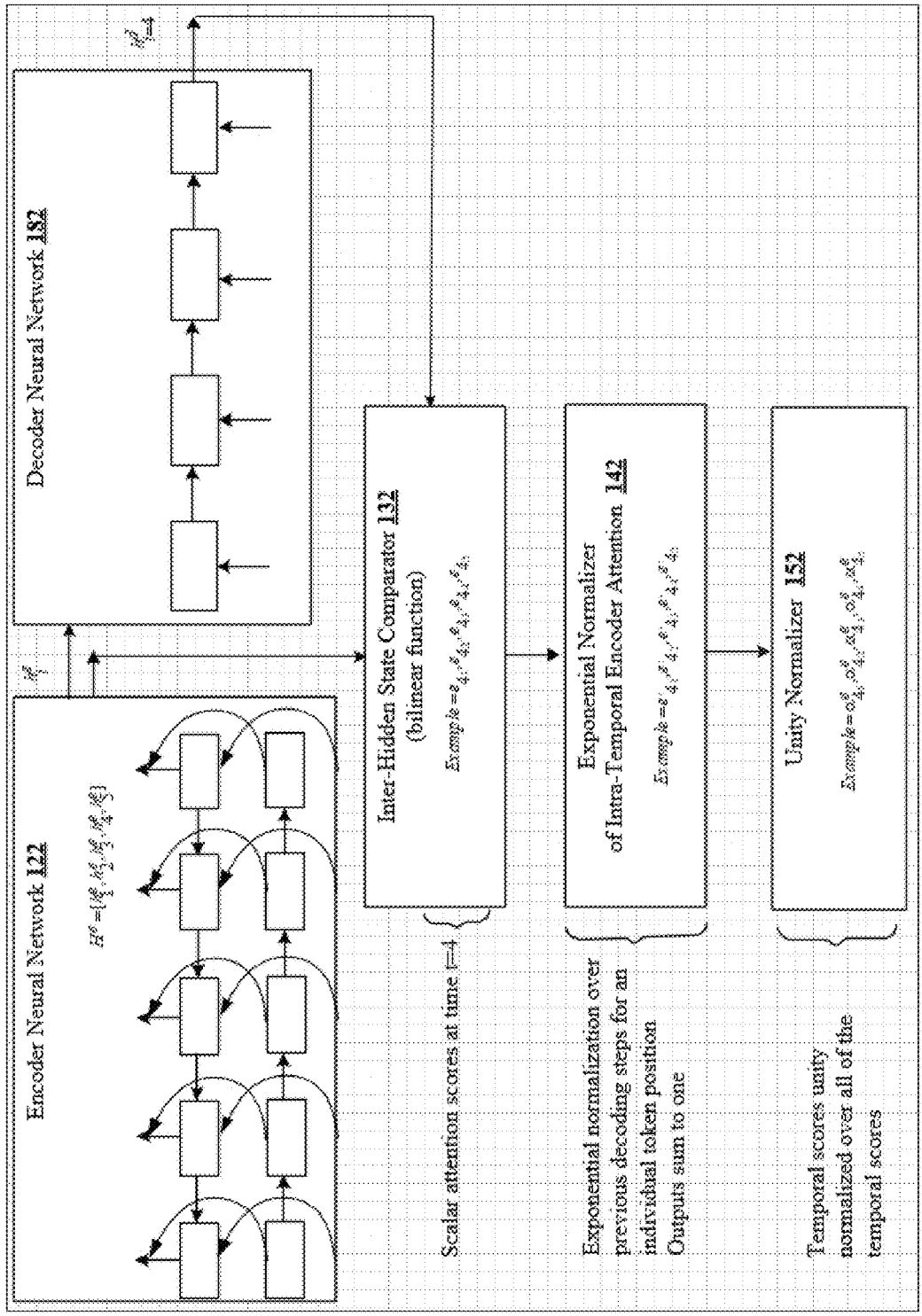
FIG. 5 and FIG. 6 together show an example of calculating the encoder context vector for a specific time stamp.
Figure 6:
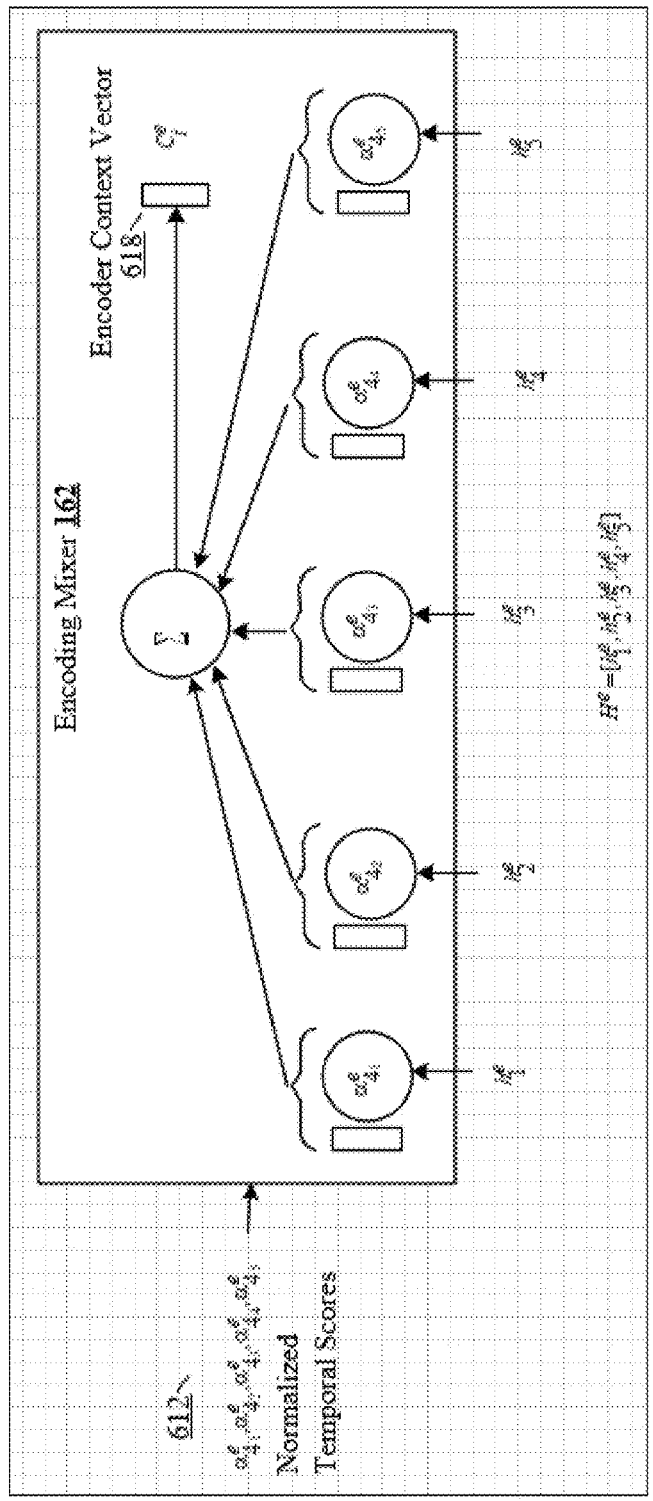

FIG. 5 and FIG. 6 together show an example of calculating the encoder context vector $c_t^e$ for the time stamp t=4.

Inter-hidden state comparator 132 calculates scalar attention scores $e_{ti}$ between current decoder hidden state $h_4^d$ and the encoder hidden state $H^e=[h_1^e, h_2^e, h_3^e, h_4^e, h_5^e]$ for the time stamp. $e_{ti}$, which is defined as a function $f$: $e_{ti}=f(h_t^d, h_i^e)$ in which the function returns a scalar $e_{ti}$ from the hidden decoder $h_t^d$ and hidden encoder $h_i^e$ vectors, utilizing a bilinear function $f(h_t^d, h_i^e)=h_t^{dT}W_{attn}^e h_i^e$. Ground truth, also referred to empirical evidence, can be used to modify the $W_{attn}^e$ vector—affecting the elementwise product. In other implementations, a simple dot-product between the two vectors can be utilized.

Continuing, FIG. 5 illustrates generating current encoder temporal scores for each of the encoder hidden states by exponentially normalizing a particular encoder hidden state's current encoder attention score over its previous encoder attention scores. Exponential normalizer of intra-temporal encoder attention 142 calculates the normalized attention score with the hidden input states $h_i^e$, over previous decoding steps for an individual token position, normalizing a current attention score for an input token position over the input token position's previous encoder attention score, using the temporal attention function, penalizing input tokens that have obtained high attention scores in past decoding steps. The temporal scores $e'_{ti}$ are defined: $e'_{ti}=\exp(e_{ti})$ for t=1 and $$e'_{ti} = \sum_{j=1}^{t-1} \exp(e_{ji})$$

otherwise. Then, unity normalizer 152 generates current normalized encoder temporal scores by unity normalizing the current encoder temporal scores: computing temporal attention scores $\alpha_{ti}^e$ normalized over all of the temporal scores, with $$\alpha_{ti}^e = \frac{e'_{ti}}{\sum_{j=1}^{n} e'_{tj}}$$

across the inputs for the n positions, and uses these weights to obtain the input context vector $c_t^e$ in which $$c_t^e = \sum_{i=1}^{n} \alpha_{ti}^e h_i^e.$$

FIG. 6 illustrates the mechanism for utilizing the normalized temporal scores 612 for calculating the encoder context vector $c_t^e$ 618 for the time stamp t=4.

Figure 7:
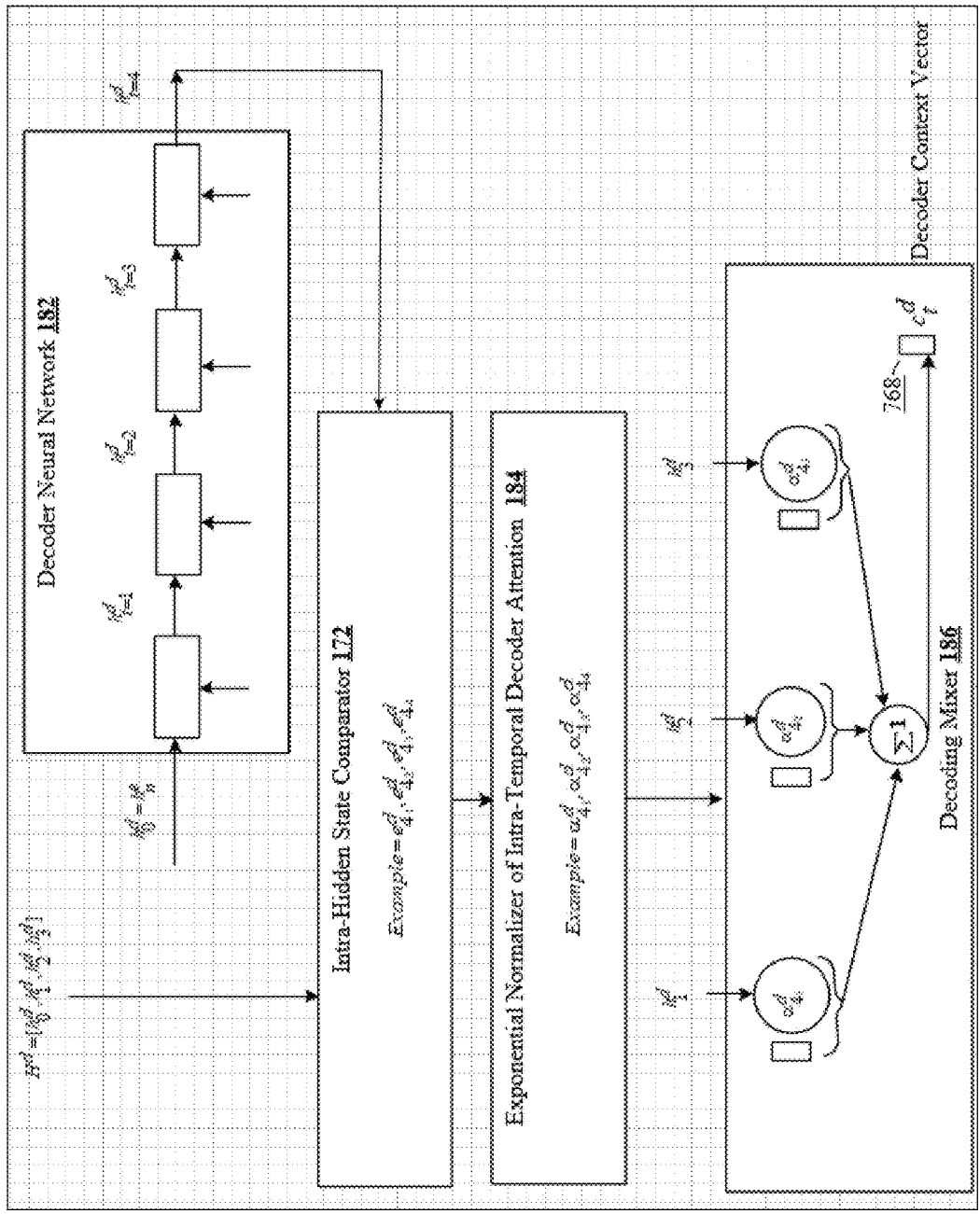
FIG. 7 illustrates an example of computing a decoder context vector at a specific time stamp.

FIG. 7 illustrates an example of computing a decoder context vector $c_t^d$ at time stamp t=4. Decoder neural network 182 computes hidden states $H^d=[h_1^d, h_2^d, h_3^d, h_4^d]$ from the embedding vectors of output $y_t$, incorporating information about the previously decoded sequence into the decoder, to prevent the generation of repeated phrases based on its own hidden states, especially when generating long sequences. Intra-hidden state comparator 172 compares the computed hidden states $H^d=[h_1^d, h_2^d, h_3^d, h_4^d]$ with the hidden state at decoding step t, applying the current decoder hidden state to each of previous decoder hidden states to produce current decoder attention scores for each of the previous decoder hidden states. For each decoding step t exponential normalizer of intra-temporal decoder attention 184 computes a new attention context vector. For t>1 exponential normalizer of intra-temporal decoder attention 184 uses the following equation to calculate attention scores: $e_{tt'}^d=h_t^{dT}W_{attn}^d d_{t'}^d$, producing the current intra-temporal encoder attention vector as a convex combination of the encoder hidden states scaled by the corresponding current normalized encoder temporal score—generating current normalized decoder attention scores for each of the previous decoder hidden states by exponentially normalizing each of the current decoder attention scores. The intra-temporal attention context vector is calculated as follows, producing the current intra-decoder attention vector as convex combination of the previous decoder hidden states scaled by the corresponding current normalized decoder attention scores and processing the vector to emit a summary token.

$$\alpha_{tt'}^d = \frac{\exp(e_{tt'}^d)}{\sum_{j=1}^{t-1} (e_{tj}^d)},$$

and tt' refers to the current time step, j=1 refers to the first decoding time step, and context vector $$c_t^d = \sum_{j=1}^{t-1} \alpha_{tj}^d h_j^d.$$

Decoder context vector $c_t^d$, with $c_1^d$ gets set to a vector of zeros since the generated sequence is empty on the first decoding step.

Exponential normalizer of intra-temporal encoder attention 142 and exponential normalizer of intra-temporal decoder attention 184 can be implemented using a common softmax module.

Figure 8:
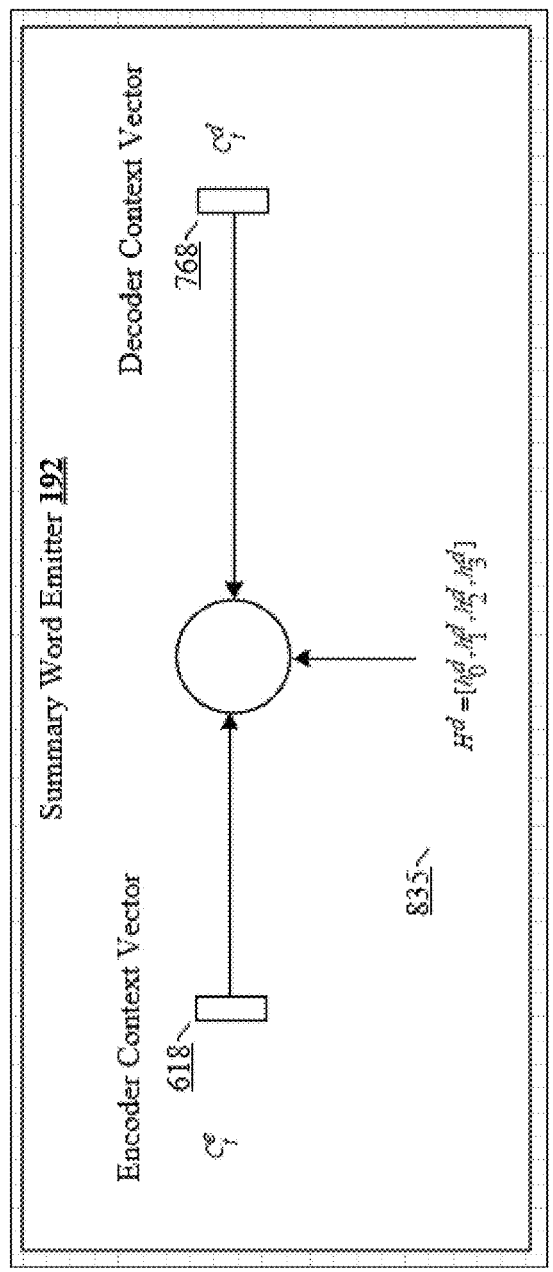
FIG. 8 shows a summary word emitter, which combines an encoder context vector, decoder context vector and the current hidden state vector.

FIG. 8 shows summary word emitter 192, which combines encoder context vector 618, decoder context vector 718 and the current hidden state vector 835. Looking back at previous decoding steps allows the disclosed abstractive text summarization architecture to make more structured predictions and avoid repeating the same information, even if that information was generated many steps away.

Figure 9:
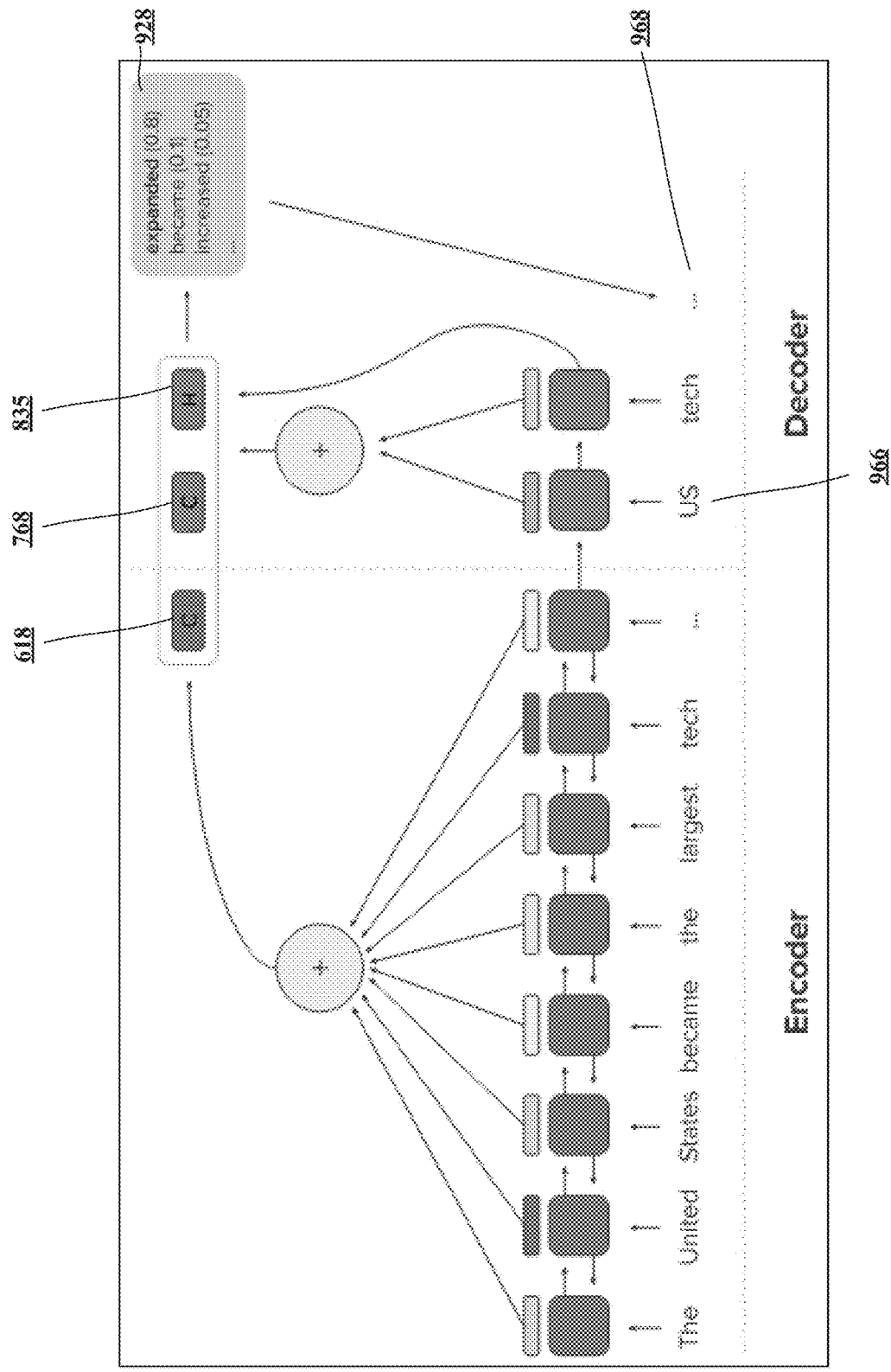
FIG. 9 shows example input document text processed by the disclosed RNN-based abstractive text summarization architecture using the combination of two attention functions at a given decoding step.

At first the disclosed reinforcement learning process lets the model generate its own summary, then uses an external scorer to compare the generated summary against the ground truth. This scorer then indicates the quality of the generated summary to the model. If the score is high, then the model can update itself to make such summaries more likely to appear in the future. Otherwise, if the score is low, the model will get penalized and change its generation procedure to prevent similar summaries. This reinforced model is very good at increasing the summarization score that evaluates the entire sequence rather than a word-by-word prediction. FIG. 9 illustrates the encoder and decoder attention functions combined, with example input document text, "The United States became the largest tech . . . " processed by the disclosed RNN-based abstractive text summarization architecture 100 using the combination of two attention functions at a given decoding step. That is, temporal attention and decoder intra-attention are used in combination to generate new words. Each element of the sequence—in this case, each word—gets processed one by one. For each new input in the sequence, a new hidden state gets generated as a function of that input and the previous hidden state. In this sense, the hidden state calculated at each word is a function of all the words read up to that point. At each step, the RNN hidden state 835 is used to generate a new word that is added to the final output text sequence 968 and fed in as the input of the next function. The input-reading and output-generating RNNs are combined, with the final hidden state of the input RNN used as the initial hidden state of the output RNN. The attention is modulated to ensure that the model uses different parts of the input when generating the output text, hence increasing information coverage of the summary. In the example, "United States" gets shortened to US 966 and an attention score of 0.8 is generated and assigned to the word "expanded", while the word "became" is assigned an attention score of 0.1 and the word "increased" is assigned an attention score of 0.05 928. The disclosed architecture is able to read any text and generate a different text from it. In one implementation of the disclosed technology, two 200-dimensional LSTMs are utilized for the bidirectional encoder and one 400-dimensional LSTM for the decoder; the input vocabulary size is limited to 150,000 tokens, and the output vocabulary is limited to 50,000 tokens by selecting the most frequent tokens in the training set. Input word embeddings are 100-dimensional and are initialized with GloVe.

Figure 10:
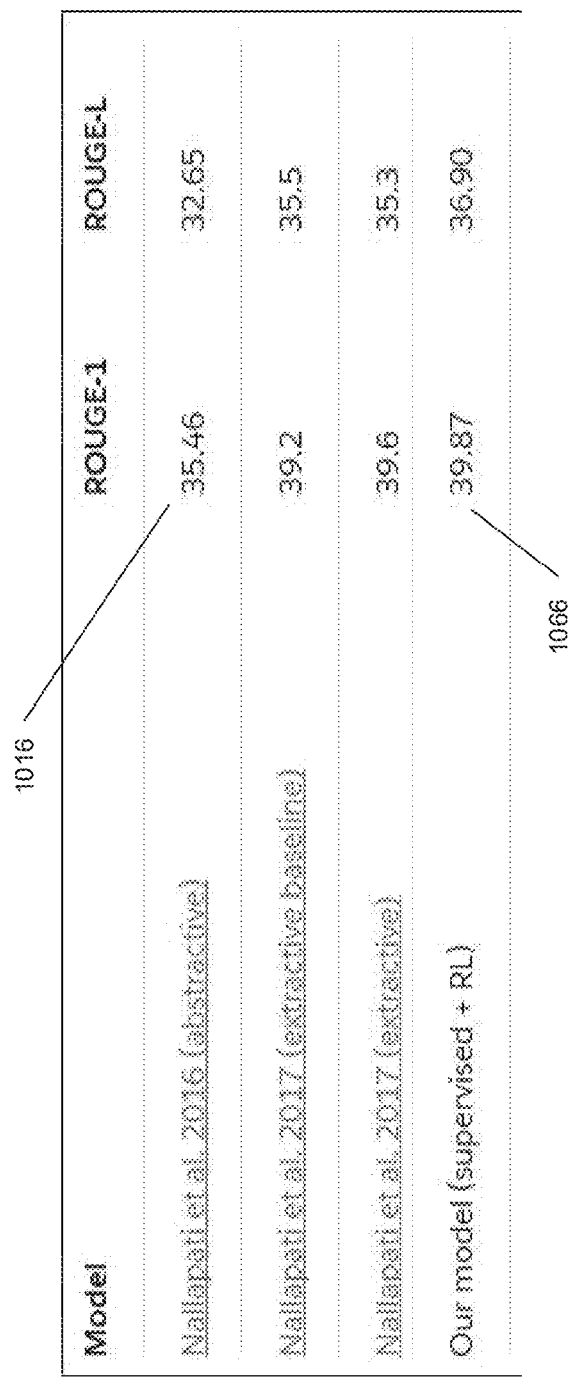
FIG. 10 shows quantitative results on the CNN/Daily Mail dataset, comparing results for the disclosed architecture with existing abstractive and extractive approaches for text summarization.

FIG. 10 shows quantitative results on the CNN/Daily Mail dataset, comparing disclosed architecture 100 with existing abstractive and extractive approaches for text summarization, via automated evaluation metric ROUGE, described supra. Until recently, the highest ROUGE-1 score for abstractive text summarization on the CNN/Daily Mail dataset was 35.46 1016. The disclosed combination of the intra-decoder attention RNN model with joint supervised and RL training improves this score to 39.87 1066, as the better ROUGE performance, and offering more readable automatically generated document summaries.

FIG. 11 and FIG. 12 show example documents and multi-sentence summaries generated by disclosed architecture 100, based on the example documents, in comparison to human-generated ground truth summaries. For each example, the original article, the ground truth summary and the summary generated via the disclosed model are shown.

The disclosed model and training procedure obtain state-of-the-art results in text summarization for the CNN/Daily Mail, improves the readability of the generated summaries and is better suited to long output sequences.

Computer System

Figure 13:
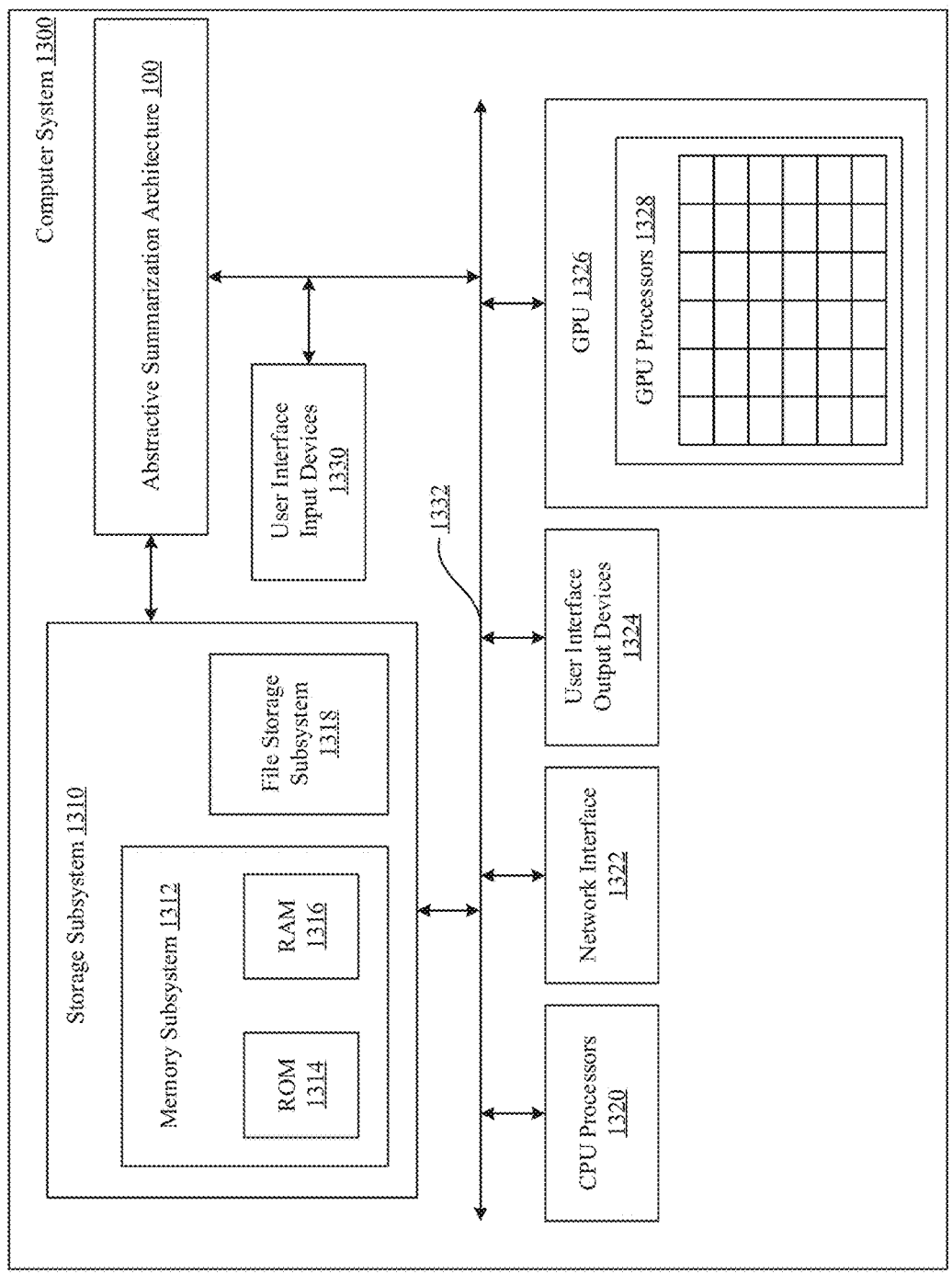
FIG. 13 is a block diagram of an example computer system for automatic abstractive text summarization.

FIG. 13 is a simplified block diagram of a computer system 1300 that can be used to implement abstractive summarization model 100. Computer system 1300 typically includes one or more CPU processors 1320 that communicate with a number of peripheral devices via bus subsystem 1332. These peripheral devices can include a memory subsystem 1312 including, for example, memory devices and a file storage subsystem 1318, user interface input devices 1330, user interface output devices 1324, a network interface subsystem 1322, and a GPU 1326 with multiple GPU processing cores or GPU processors 1328. The input and output devices allow user interaction with computer system 1300. Network interface subsystem 1322 provides an interface to outside networks, including an interface to corresponding interface devices in other computer systems.

The operations of the abstractive summarization model 100 are performed by the GPU processing cores 1328, according to some implementations.

User interface input devices 1330 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1324 can include a display subsystem, a printer, a fax machine, or non-visual displays such as audio output devices. The display subsystem can include an LED display, a flat-panel device such as a liquid crystal display (LCD), a cathode ray tube (CRT), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. These software modules are generally executed by CPU processors 1320 alone or in combination with other processors like GPU processors 1328.

Memory subsystem 1312 in the storage subsystem can include a number of memories including a main random access memory (RAM) 1316 for storage of instructions and data during program execution and a read only memory (ROM) 1314 in which fixed instructions are stored. A file storage subsystem 1318 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1318 or the memory subsystem 1312 or in other machines accessible by the processor.

Bus subsystem 1332 provides a mechanism for letting the various components and subsystems of computer system 1300 communicate with each other as intended. Although bus subsystem 1332 is shown schematically as a single bus, alternative implementations of the bus subsystem can use multiple busses. In some implementations, an application server (not shown) can be a framework that allows the applications of computer system 1300 to run, such as the hardware and/or software, e.g., the operating system.

Computer system 1300 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1300 depicted in FIG. 13 is intended only as a specific example for purposes of illustrating the preferred embodiments of the present invention. Many other configurations of computer system 1300 are possible having more or less components than the computer system depicted in FIG. 13.

The preceding description is presented to enable the making and use of the technology disclosed. Various modifications to the disclosed implementations will be apparent, and the general principles defined herein may be applied to other implementations and applications without departing from the spirit and scope of the technology disclosed.

Similarly, process steps listed may not be limited to the order shown or discussed. The specification and drawings are, accordingly, to be regarded in an illustrative rather than a restrictive sense. Thus, the technology disclosed is not intended to be limited to the implementations shown, but is to be accorded the widest scope consistent with the principles and features disclosed herein.

Some Particular Implementations

Some particular implementations and features are described in the following discussion.

One implementation of a disclosed neural network-implemented method of abstractive text summarization, includes processing input token embeddings of a document through a recurrent encoder that produces encoder hidden states for each of the embeddings; initializing a recurrent attentive decoder with an ultimate encoder hidden state and a special start-of-summary token to produce decoder hidden states at successive decoding steps; and at each decoding step, the decoder emitting a summary token using a current intra-temporal encoder attention vector, a current intra-decoder attention vector, and a current decoder hidden state. The method also includes applying the current decoder hidden state to each of the encoder hidden states to produce current encoder attention scores for each of the encoder hidden states; generating current encoder temporal scores for each of the encoder hidden states by exponentially normalizing a particular encoder hidden state's current encoder attention score over its previous encoder attention scores; generating current normalized encoder temporal scores by unity normalizing the current encoder temporal scores; producing the current intra-temporal encoder attention vector as a convex combination of the encoder hidden states scaled by the corresponding current normalized encoder temporal scores; applying the current decoder hidden state to each of previous decoder hidden states to produce current decoder attention scores for each of the previous decoder hidden states; generating current normalized decoder attention scores for each of the previous decoder hidden states by exponentially normalizing each of the current decoder attention scores; and producing the current intra-decoder attention vector as convex combination of the previous decoder hidden states scaled by the corresponding current normalized decoder attention scores and processing the vector to emit a summary token.

This method and other implementations of the technology disclosed can include one or more of the following features and/or features described in connection with additional methods disclosed. In the interest of conciseness, the combinations of features disclosed in this application are not individually enumerated and are not repeated with each base set of features.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

For one implementation of the neural network-implemented method, the embeddings are embedded in a high-dimensional word embedding space.

For the disclosed method, the bidirectional RNN-based encoder comprises two separate long short-term memory (LSTM) networks, and the RNN-based decoder comprises a single LSTM network. In some disclosed implementations, the encoder is a bi-directional recurrent neural network (abbreviated Bi-RNN) comprising forward and backward RNNs, the forward and backward RNNs each receiving the embeddings as input to produce forward and backward RNN hidden states, and the encoder hidden states being concatenations of respective forward and backward RNN hidden states.

To implement the best of both supervised learning and reinforcement learning, the disclosed method can further include training the abstractive text summarization model using a combination of reinforcement learning and supervised learning, and can further include training the abstractive summarization model using a mixed training objective function that mixes supervised machine learning that minimizes a maximum-likelihood loss at each decoding step to score relevance by comparing decoder summary output to a ground-truth summary of the document sequence, with reinforcement learning that evaluates the decoder summary output against baseline output and feeds back a reward or penalty for readability of the decoder summary output, wherein the mix between the supervised machine learning and the reinforcement learning is a weighted average. The disclosed method makes use of both word-level and whole-summary-level supervision to make it more coherent and readable. In particular, ROUGE-optimized RL helps improve recall, ensuring that the important information that needs to be summarized is indeed included and word level learning supervision ensures good language flow, making the summary more coherent and readable.

Documents cited in the provisional application, "ROUGE: A Package for Automatic Evaluation of Summaries" and "The ROUGE-AR: A Proposed Extension to the ROUGE Evaluation Metric for Abstractive Text Summarization" identify different types of the ROUGE evaluation metric. To optimize discrete evaluation metrics like ROUGE, the disclosed abstractive text summarization architecture uses reinforcement learning algorithms. For some implementations of the disclosed method the reinforcement learning is implemented using a self-critical sequence training (SCST) algorithm, and the supervised learning is implemented using a maximum-likelihood loss training objective (ML).

For some disclosed implementations, the abstractive summarization model is used to summarize document sequences of 400 to 800 tokens in summary sequences of 40 to 100 tokens.

In one disclosed implementation, the abstractive text summarization model is used to perform machine translation-based natural language processing (NLP) tasks. In another disclosed implementation, the abstractive summarization model is used to perform question answering-based NLP tasks. In yet another implementation, the abstractive summarization model is used to perform dialog systems-based NLP tasks.

Some implementations of the disclosed method further include evaluating performance of the abstractive summarization model on ROUGE discrete evaluation metrics. In another implementation of the disclosed method for implementing a neural sequence method that implements an abstractive summarization model, BLEU or METEOR evaluation metrics can be utilized.

Some implementations of the disclosed method further include requiring the RNN-based decoder to not output a same trigram sequence of output summary tokens more than once in a summary.

One implementation of a disclosed method for implementing a neural sequence method that implements an abstractive summarization model includes embedding input document tokens of a document sequence in a word embedding space, and providing the input document token embeddings to a bidirectional recurrent neural network (RNN)-based encoder to produce an overall bidirectional encoding for the input document and token bidirectional encodings for the input document tokens of the document sequence. The disclosed method also includes initializing a RNN-based decoder with the overall bidirectional encoding as an initial current decoder hidden state. The method further includes, at each decoding step, the RNN-based decoder calculating an intra-temporal encoder attention vector by applying the current decoder hidden state to the token bidirectional encodings to produce encoded state attention weights for the input document tokens; exponentially normalizing the encoded state attention weights; and calculating a weighted sum of the token bidirectional encodings based on the normalized encoded state attention weights. Additionally, the method includes at each decoding step, the RNN-based decoder calculating an intra-decoder attention vector by applying the current decoder hidden state to previously calculated decoder hidden states to produce decoded state attention weights for each of the previously calculated decoder hidden states; exponentially normalizing the decoded state attention weights; and calculating a weighted sum of the previously calculated decoder hidden states based on the normalized decoded state attention weights; and at each decoding step, concatenating the intra-decoder attention vector with the intra-temporal encoder attention vector and with the current decoder hidden state and processing the concatenated vector to emit a summary token.

Yet another implementation may include tangible non-transitory computer readable media, including computer program instructions loaded onto the media that, when combined with computer hardware and executed, cause a computer to implement any of the methods described earlier.

A system implementation of the disclosed methods includes one or more processors coupled to memory, that implement any of the methods described earlier.

For some implementations, the disclosed system can further include the attentive decoder emitting a current summary token by combining a current decoder hidden state and results of attending over the encoder hidden states and its previously produced decoder hidden states. In some implementations, the decoder attention over the encoder hidden states focuses on unsummarized portions of the document. In some cases the decoder attention over the previously produced decoder hidden states prevents emission of repeated summary phrases.

Some implementations of the disclosed neural network-based abstractive text summarization system further include training the abstractive summarization model using a combination of reinforcement learning and supervised learning. Some implementations of the neural network-based abstractive text summarization system include training the abstractive summarization model using a mixed training objective function that mixes supervised machine learning that minimizes a maximum-likelihood loss at each decoding step to score relevance by comparing decoder summary output to a ground-truth summary of the document sequence, with reinforcement learning that evaluates the decoder summary output against baseline output and feeds back a reward or penalty for readability of the decoder summary output, wherein the mix between the supervised machine learning and the reinforcement learning is a weighted average.

This system implementation and other systems disclosed optionally include one or more of the features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim as follows:

1. A neural network-implemented method of abstractive text summarization, the method including:

processing input token embeddings of a document through a recurrent encoder that produces encoder hidden states for each of the embeddings;

initializing a recurrent attentive decoder with an ultimate encoder hidden state and a special start-of-summary token to produce decoder hidden states at successive decoding steps; and at each decoding step, the decoder emitting a summary token using a current intra-temporal encoder attention vector, a current intra-decoder attention vector, and a current decoder hidden state, including:

applying the current decoder hidden state to each of the encoder hidden states to produce current encoder attention scores for each of the encoder hidden states;

generating current encoder temporal scores for each of the encoder hidden states by exponentially normalizing a particular encoder hidden state's current encoder attention score over its previous encoder attention scores;

generating current normalized encoder temporal scores by unity normalizing the current encoder temporal scores;

producing the current intra-temporal encoder attention vector as a convex combination of the encoder hidden states scaled by corresponding current normalized encoder temporal scores;

applying the current decoder hidden state to each of previous decoder hidden states to produce current decoder attention scores for each of the previous decoder hidden states;

generating current normalized decoder attention scores for each of the previous decoder hidden states by exponentially normalizing each of the current decoder attention scores; and producing the current intra-decoder attention vector as a convex combination of the previous decoder hidden states scaled by corresponding current normalized decoder attention scores and processing the vector to emit a summary token.

2. The neural network-implemented method of claim 1, wherein the embeddings are embedded in a high-dimensional word embedding space.

3. The neural network-implemented method of claim 1, wherein the encoder is a bi-directional recurrent neural network (abbreviated Bi-RNN) comprising forward and backward RNNs, the forward and backward RNNs each receiving the embeddings as input to produce forward and backward RNN hidden states, and the encoder hidden states being concatenations of respective forward and backward RNN hidden states.

4. The method according to claim 1, wherein abstractive text summarization is used to summarize document sequences of 400 to 800 tokens in summary sequences of 40 to 100 tokens.

5. The method according to claim 1, wherein abstractive text summarization is used to perform machine translation-based natural language processing (abbreviated NLP) tasks.

6. The method according to claim 1, further including:
evaluating performance of the abstractive text summarization on ROUGE metrics.

7. The method according to claim 1, further including:
requiring the recurrent attentive decoder to not output a same trigram sequence of output summary tokens more than once in a summary.

8. A neural network-based abstractive text summarization system running on parallel processors, the system comprising:
an encoder that produces encoder hidden states for input tokens of a document to be summarized;
an attentive decoder that emits summary tokens which summarize the document by attending over the encoder hidden states and its previously produced decoder hidden states;
the decoder attention over the encoder hidden states encouraging input tokens not previously attended by the decoder and penalizing input tokens previously attended by the decoder; and
the decoder attention over the previously produced decoder hidden states encouraging summary token candidates not previously emitted by the decoder and penalizing summary token candidates previously emitted by the decoder.

9. The system of claim 8, further including the attentive decoder emitting a current summary token by combining a current decoder hidden state and results of attending over the encoder hidden states and its previously produced decoder hidden states.

10. The system of claim 8, wherein the decoder attention over the encoder hidden states focuses on unsummarized portions of the document.

11. The system of claim 8, wherein the decoder attention over the previously produced decoder hidden states prevents emission of repeated summary phrases.

12. A neural network-based abstractive text summarization system, including one or more processors and memory, coupled to the processors, containing computer instructions that, when executed on the processors, cause the system to implement a process that implements an abstractive summarization model, the system comprising:
a decoder attention over encoder hidden states encouraging input tokens not previously attended by a decoder and penalizing input tokens previously attended by the decoder; and
embeddings of input document tokens of document sequences in a word embedding space;
a bidirectional recurrent neural network (abbreviated RNN)-based encoder to produce an overall bidirectional encoding for the input document and token bidirectional encodings for the input document tokens of the document sequences using the input document token embeddings provided;
a RNN-based decoder initialized with the overall bidirectional encoding as an initial current decoder hidden state;
the RNN-based decoder calculating an intra-temporal encoder attention vector at each decoding step by applying a current decoder hidden state to the token bidirectional encodings to produce encoded state attention weights for the input document tokens;
exponentially normalizing the encoded state attention weights; and
calculating a weighted sum of the token bidirectional encodings based on the normalized encoded state attention weights;
the RNN-based decoder calculating an intra-decoder attention vector at each decoding step by:
applying the current decoder hidden state to previously calculated decoder hidden states to produce decoded state attention weights for each of the previously calculated decoder hidden states;
exponentially normalizing the decoded state attention weights; and
calculating a weighted sum of the previously calculated decoder hidden states based on the normalized decoded state attention weights; and
at each decoding step, concatenating the intra-decoder attention vector with the intra-temporal encoder attention vector and with the current decoder hidden state and processing the concatenated vector to emit a summary token.

13. The neural network-based abstractive text summarization system of claim 12, wherein the bidirectional RNN-based encoder comprises two separate long short-term memory (abbreviated LSTM) networks.

14. The neural network-based abstractive text summarization system of claim 12, wherein the RNN-based decoder comprises a long short-term memory (abbreviated LSTM) network.

15. The neural network-based abstractive text summarization system of claim 12, further including:
training the abstractive summarization model using a combination of reinforcement learning and supervised learning.

16. The neural network-based abstractive text summarization system of claim 12, further including:
training the abstractive summarization model using a mixed training objective function that mixes supervised machine learning that minimizes a maximum-likelihood loss at each decoding step to score relevance by comparing decoder summary output to a ground-truth summary of a document sequence, with reinforcement learning that evaluates the decoder summary output against baseline output and feeds back a reward or penalty for readability of the decoder summary output, wherein the mix between the supervised machine learning and the reinforcement learning is a weighted average.

17. The neural network-based abstractive text summarization system of claim 16, wherein the reinforcement learning is implemented using a self-critical sequence training (abbreviated SCST) algorithm.

18. The neural network-based abstractive text summarization system of claim 16, wherein the supervised machine learning is implemented using a maximum-likelihood loss training objective (abbreviated ML).

19. The neural network-based abstractive text summarization system of claim 12, wherein the abstractive summarization model is used to summarize the document sequence of 400 to 800 tokens in summary sequence of 40 to 100 tokens.

20. The neural network-based abstractive text summarization system of claim 12, further including:
evaluating performance of the abstractive summarization model on ROUGE metrics.

21. The neural network-based abstractive text summarization system of claim 12, further including:
requiring the RNN-based decoder to not output a same trigram sequence of output summary tokens more than once in a summary.

22. A tangible non-transitory computer readable storage medium impressed with computer program instructions that implement an abstractive summarization model, the instructions, when executed on a processor, implement a method comprising:
processing input token embeddings of a document through a recurrent encoder that produces encoder hidden states for each of the embeddings;
initializing a recurrent attentive decoder with an ultimate encoder hidden state and a special start-of-summary token to produce decoder hidden states at successive decoding steps; and
at each decoding step, the decoder emitting a summary token using a current intra-temporal encoder attention vector, a current intra-decoder attention vector, and a current decoder hidden state, including:
applying the current decoder hidden state to each of the encoder hidden states to produce current encoder attention scores for each of the encoder hidden states;
generating current encoder temporal scores for each of the encoder hidden states by exponentially normalizing a particular encoder hidden state's current encoder attention score over its previous encoder attention scores;
generating current normalized encoder temporal scores by unity normalizing the current encoder temporal scores;
producing the current intra-temporal encoder attention vector as a convex combination of the encoder hidden states scaled by corresponding current normalized encoder temporal scores;
applying the current decoder hidden state to each of previous decoder hidden states to produce current decoder attention scores for each of the previous decoder hidden states;
generating current normalized decoder attention scores for each of the previous decoder hidden states by exponentially normalizing each of the current decoder attention scores; and
producing the current intra-decoder attention vector as a convex combination of the previous decoder hidden states scaled by corresponding current normalized decoder attention scores and processing the vector to emit a summary token.

23. The tangible non-transitory computer readable storage medium of claim 22, wherein abstractive text summarization is used to summarize document sequences of 400 to 800 tokens in summary sequences of 40 to 100 tokens.

24. The tangible non-transitory computer readable storage medium of claim 22, further including:
training the abstractive summarization model using a combination of reinforcement learning and supervised learning.

25. The tangible non-transitory computer readable storage medium of claim 24, further including:
training the abstractive summarization model using a mixed training objective function that mixes
supervised machine learning that minimizes a maximum-likelihood loss at each decoding step to score relevance by comparing decoder summary output to a ground-truth summary of the document sequence, with
reinforcement learning that evaluates the decoder summary output against baseline output and feeds back a reward or penalty for readability of the decoder summary output,
wherein the mix between the supervised machine learning and the reinforcement learning is a weighted average.

* * * * *

UNITED STATES PATENT AND TRADEMARK OFFICE
CERTIFICATE OF CORRECTION

PATENT NO.        : 10,474,709 B2
APPLICATION NO.   : 15/815686
DATED             : November 12, 2019
INVENTOR(S)       : Romain Paulus Page 1 of 1

It is certified that error appears in the above-identified patent and that said Letters Patent is hereby corrected as shown below:

In the Claims

Column 16, Lines 7-10 Claim 12, delete "a decoder attention over encoder hidden states encouraging input tokens not previously attended by a decoder and penalizing input tokens previously attended by the decoder; and"

Signed and Sealed this
Fifth Day of May, 2020

Andrei Iancu
*Director of the United States Patent and Trademark Office*